US012774115B2

(12) United States Patent
Thompson et al.

(10) Patent No.: US 12,774,115 B2
(45) **Date of Patent: *Oct. 27, 2026**

(54) SPACECRAFT STACK ASSEMBLY AND METHOD FOR STACKING, SECURING, AND RELEASING SPACECRAFT

(71) Applicant: Space Exploration Technologies Corp., Hawthorne, CA (US)

(72) Inventors: Andrew C. Thompson, Hebron, CT (US); Patrick Sodt, Anaheim, CA (US); Thomas Tarlton, Los Angeles, CA (US); Robert S. Tarlton, Playa Vista, CA (US); Solomon Westerman, Redmond, WA (US); Michael Dergance, Hermosa Beach, CA (US)

(73) Assignee: Space Exploration Technologies Corp., Starbase, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/415,398

(22) Filed: Jan. 17, 2024

(65) Prior Publication Data

US 2024/0199240 A1 Jun. 20, 2024

Related U.S. Application Data

(63) Continuation of application No. 16/870,974, filed on May 10, 2020, now Pat. No. 11,878,820.

(60) Provisional application No. 62/847,865, filed on May 14, 2019.

(51) Int. Cl.

| | |
|---|---|
| ***B64G 1/64*** | (2006.01) |
| ***B64G 1/22*** | (2006.01) |
| ***B64G 1/24*** | (2006.01) |
| ***B64G 1/40*** | (2006.01) |

(52) U.S. Cl.

CPC ........... *B64G 1/643* (2023.08); *B64G 1/2427* (2023.08); *B64G 1/645* (2013.01); *B64G 1/223* (2023.08); *B64G 1/226* (2013.01); *B64G 1/40* (2013.01)

(58) Field of Classification Search

CPC ............ B64G 1/007; B64G 2001/1092; B64G 1/226; B64G 1/40; B64G 1/641; B64G 2001/643; B64G 1/645

USPC ...................................................... 244/173.3

See application file for complete search history.

(56) References Cited

U.S. PATENT DOCUMENTS

| | | | |
|---|---|---|---|
| 3,420,470 | A | 1/1969 | Meyer |
| 4,676,167 | A | 6/1987 | Huber, Jr. et al. |
| 4,854,526 | A | 8/1989 | Rochefort |
| 5,052,640 | A | 10/1991 | Chang |
| 5,209,437 | A | 5/1993 | Fantar |
| 5,350,137 | A | 9/1994 | Henley |
| 5,386,953 | A | 2/1995 | Stuart |
| 5,411,226 | A | 5/1995 | Jones et al. |

(Continued)

OTHER PUBLICATIONS

Jeremy Banik, Structural Scaling Metrics For Tensioned-Blanket Space Systems, PHD thesis, The University of New Mexico, Albuquerque, New Mexico, USA, May 2014, 199 pages.

(Continued)

*Primary Examiner* — Brady W Frazier

(74) *Attorney, Agent, or Firm* — Polsinelli PC

(57) ABSTRACT

A method of deploying a plurality of spacecraft includes coupling the plurality of spacecraft in a stack to a payload adaptor, the stack extending along a longitudinal axis; launching the payload adaptor into an orbit; and decoupling an entirety of the stack from the payload adaptor after the payload adaptor reaches the orbit.

16 Claims, 11 Drawing Sheets

(56) References Cited

U.S. PATENT DOCUMENTS

| | | | |
|---|---|---|---|
| 5,566,909 | A | 10/1996 | Lapins |
| 5,884,866 | A | 3/1999 | Steinmeyer et al. |
| 5,961,738 | A | 10/1999 | Benton et al. |
| 6,016,999 | A | 1/2000 | Simpson et al. |
| 6,279,482 | B1 | 8/2001 | Smith et al. |
| 6,296,206 | B1 | 10/2001 | Chamness et al. |
| 8,387,921 | B2 | 3/2013 | Taylor et al. |
| 9,027,889 | B2 | 5/2015 | Aston et al. |
| 9,073,646 | B2 | 7/2015 | Balemboy et al. |
| 10,407,190 | B2 | 9/2019 | Fernandez et al. |
| 2005/0050841 | A1 | 3/2005 | Legrand et al. |
| 2006/0016935 | A1 | 1/2006 | Jordan et al. |
| 2017/0320597 | A1 | 11/2017 | Lim |
| 2018/0162561 | A1 | 6/2018 | Estevez et al. |
| 2018/0170586 | A1 | 6/2018 | Riskas |

OTHER PUBLICATIONS

Straubel et al., Evaluation of Different Architectural Concepts For Huge Deployable Solar Arrays For Electric Propelled Space Crafts, Sep. 2016, 36 pages.

SPACECRAFT STACK ASSEMBLY AND METHOD FOR STACKING, SECURING, AND RELEASING SPACECRAFT

CROSS-REFERENCE TO RELATED APPLICATION

The present application is a continuation of U.S. patent application Ser. No. 16/870,974 filed May 10, 2020 entitled "METHOD FOR STACKING, SECURING, AND RELEASING A SPACECRAFT STACK ASSEMBLY FROM A ROCKET," which claims priority to U.S. Provisional Patent Application No. 62/847,865 filed May 14, 2019 entitled "SPACECRAFT STACK ASSEMBLY AND METHOD FOR STACKING, SECURING, AND RELEASING SPACECRAFT," the contents of each of which are hereby incorporated by reference in their entirety.

BACKGROUND

To reduce launch costs, many launch vehicles (or rockets) used to carry a payload into outer space have been designed to simultaneously carry a plurality of spacecraft such as, for example, a plurality of satellites. In one approach, the launch vehicle includes a dedicated dispenser system, which separately supports each spacecraft during lift-off and then individually dispenses each spacecraft in orbit. However, such a system tends to be bulky and heavy, which reduces the useable payload that can be carried into orbit by the launch vehicle.

In another approach, a system for deploying spacecraft from a launch vehicle may include securing spacecraft(s) in layers in a stack, where the spacecraft(s) in each layer is releasably secured to adjacent layers of spacecraft(s), and a controller is used to release, layer by layer, each spacecraft (s). In such an approach, releasable fasteners may be used to secure the layers of spacecraft together, and biasing devices can be used to help facilitate separation of the layers and/or to cause the spacecraft to rotate when released from the stack. Such a system, although less heavy and bulky, is complicated to install and control.

Therefore, there exists a need for a simplified system for releasing spacecraft, such as satellites, for independent flight. Embodiments of the present disclosure are directed to solving this and other problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method of deploying a plurality of spacecraft is provided. The method includes coupling the plurality of spacecraft in a stack to a payload adaptor, the stack extending along a longitudinal axis; launching the payload adaptor into an orbit; and decoupling an entirety of the stack from the payload adaptor after the payload adaptor reaches the orbit.

In another aspect, a method of releasing spacecraft from a payload adaptor is provided. The method includes arranging spacecraft in a stack on the payload adaptor, the stack extending along a longitudinal axis; applying a compressive load along a length of the stack; launching the payload adaptor into an orbit; and after the payload adaptor reaches the orbit, releasing the compressive load to allow an entirety of the stack to separate from the payload adaptor.

In another aspect, a method for deploying spacecraft into orbit is provided. The method includes arranging a stack of spacecraft on a payload adaptor, the stack extending along a longitudinal axis, with each layer of the stack defined by at least one spacecraft and with each spacecraft being releasably mated with at least one spacecraft in an adjacent layer; securing a first end of a tension rod to the payload adaptor and a second end of the tension rod to the stack; launching the payload adaptor into an orbit; and releasing, as the payload adaptor is in the orbit, the stack from the payload adaptor to allow the stack to passively separate.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
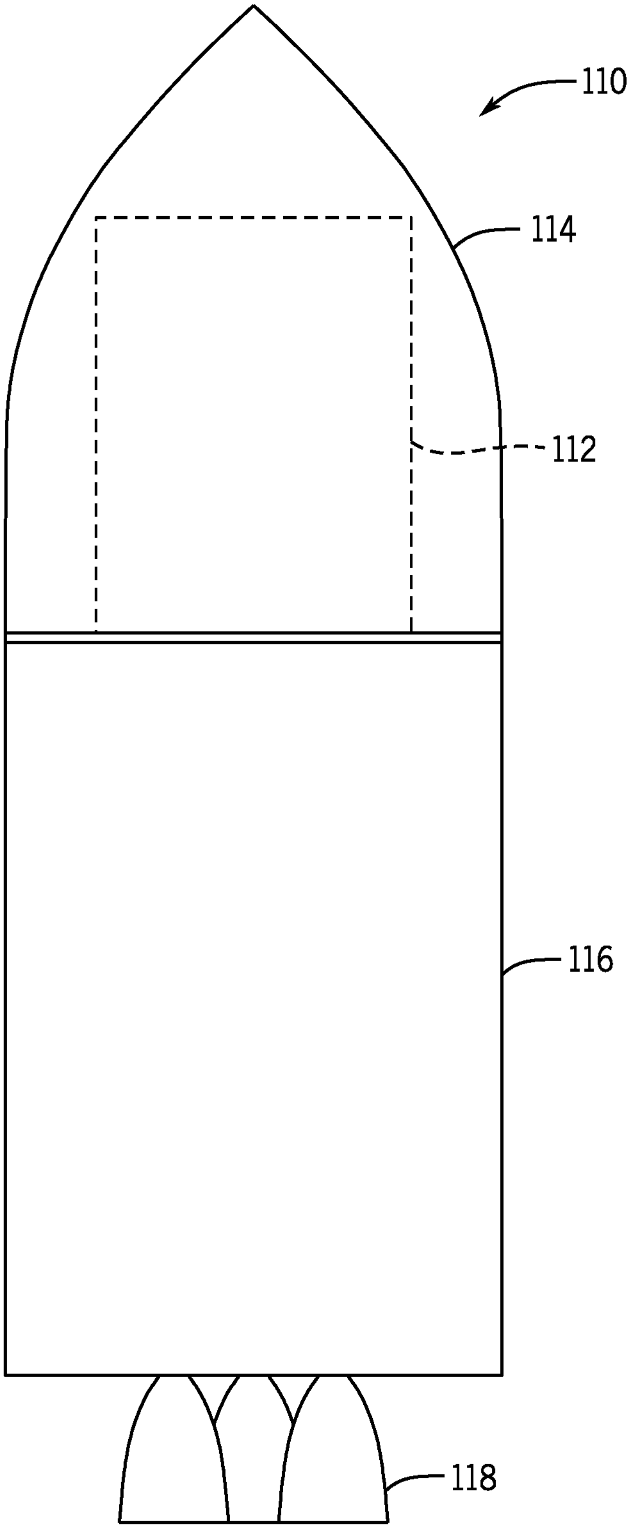
FIG. 1 depicts a simplified diagram of a rocket and a spacecraft system disposed within a rocket according to one embodiment of the present disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top", "bottom", "forward," "aft," "up," "down," "vertical", "horizontal", "retracted", "extended", and "lateral" in the present disclosure is meant to provide orientation for the reader with reference to the drawings and is not intended to be the required orientation of the components or to impart orientation limitations into the claims. Moreover, terms such as "position", "configuration" etc., may be used interchangeably without departing from the scope of the present disclosure.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller, data processor, or logic circuitry that is specifically programmed, configured or constructed to perform one or more of the computer-executable instructions described above. Accordingly, the terms "computer" and "controller" as generally used herein refer to any suitable data processor.

Embodiments of the present disclosure are directed to systems and methods of operation for payload transport and launch from a rocket. In particular, the exemplary embodiments disclosed herein relate to a system for securing spacecraft to a rocket in a stack and passively deploying the stack into orbit.

FIG. 1 depicts a rocket 110 including an exemplary spacecraft system 112 secured inside a fairing 114 coupled to a launch vehicle 116. The launch vehicle 116 provides a rocket engine for propelling the rocket 110 during launch and/or flight. For example, the launch vehicle 116 can include one or more internal fuel chambers containing a rocket fuel (i.e., a propellant), combustion chambers, and/or rocket engine nozzles 118. The rocket fuel combusts in the combustion chamber to produce hot, high pressure gas, which the rocket engine nozzle 118 exhausts away from the launch vehicle 116. The rocket engine nozzle 118 can accelerate the gas received from the combustion chamber to facilitate converting thermal energy of the gas into kinetic energy of the launch vehicle 116. The launch vehicle 116 may include a single engine stage or a plurality of engine stages, which separate and ignite in sequence.

The fairing 114 is coupled to the launch vehicle 116 and encloses the spacecraft system 112 to protect the spacecraft system 112 from aerodynamic forces during flight through an atmosphere. The fairing 114 can then separate from the launch vehicle 116 after the aerodynamic forces drop below a certain value and/or the launch vehicle 116 reaches a particular location. By separating the fairing 114 from the launch vehicle 116, the spacecraft system 112 can be exposed to an external environment such as, for example, outer space. The spacecraft system 112 can then deploy into orbit a plurality of spacecraft such as, for example, satellites and/or interplanetary probes, as shown and described herein.

Spacecraft Stacking Assembly

Figure 2:
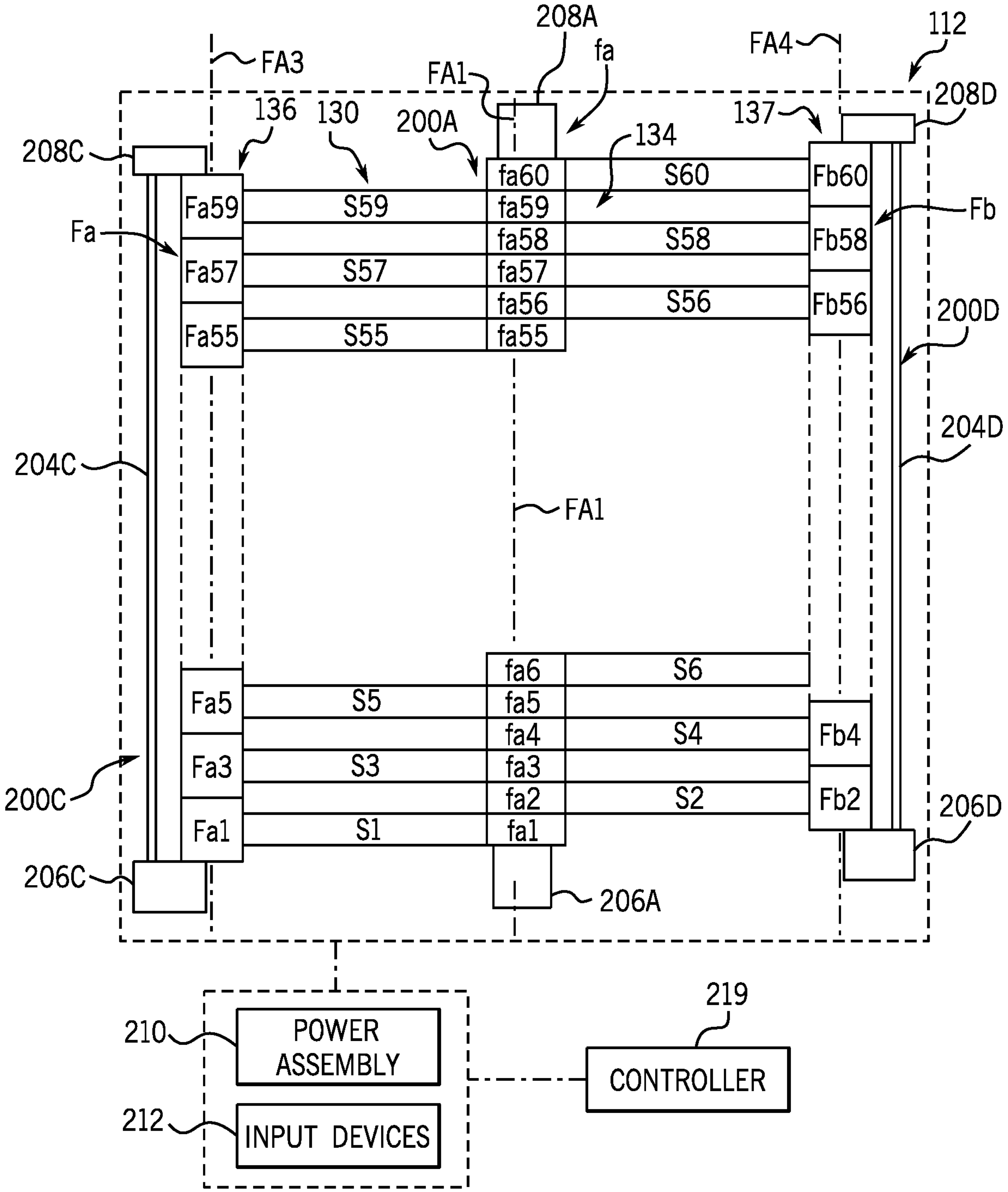
FIG. 2 depicts a simplified schematic diagram of the spacecraft system of FIG. 1.

FIG. 2 depicts a schematic of the spacecraft system 112 having plurality of satellites in a stacked configuration disposed within a payload fairing of a launch vehicle. The plurality of satellites include at least one bottom or aft satellite disposed vertically below at least one top or forward satellite, wherein the satellites bear the launch load, and a structure extending along the length of the stack releasably secures the satellites in the stacked configuration and releasably secures the stack to a payload adaptor (see adaptor 140) of the launch vehicle 116.

In the depicted example, a stack 130 includes sixty satellites S1-S60, with thirty satellites defining a first half of the stack, and with the remaining thirty satellites defining the second half of the stack in an overall substantially rectangular configuration. The first half of the stack includes satellites S1, S3, . . . , S55, S57, S59, stacked vertically on top of one another, and the second half of the stack includes satellites S2, S4, . . . , S56, S58, S60, stacked vertically on top of one another. The satellites are stacked such that the satellites in the second half of the stack are vertically offset from the satellites in the first half of the stack by the height of a single satellite. In other words, the stack 130 is arranged with vertically stacked satellites in a side by side stepped configuration. Each "layer" of the stack can be considered to include one satellite (a single step of the stack) or two satellites (two steps of the stack). It should be appreciated that the exemplary stack 130 depicted may instead have many other configurations, such as a different number or arrangement of satellites, a different type of spacecraft, etc., without departing from the scope of the claimed subject matter.

The satellites are releasably secured in a side-by-side, stepped stacked configuration through a suitable satellite separation fitting system. In general, the satellite separation fitting system is configured to releasably mate the layered satellites such that they passively release into orbit when released from the rocket while defining a primary load path(s) for the stack 130.

Figure 3:
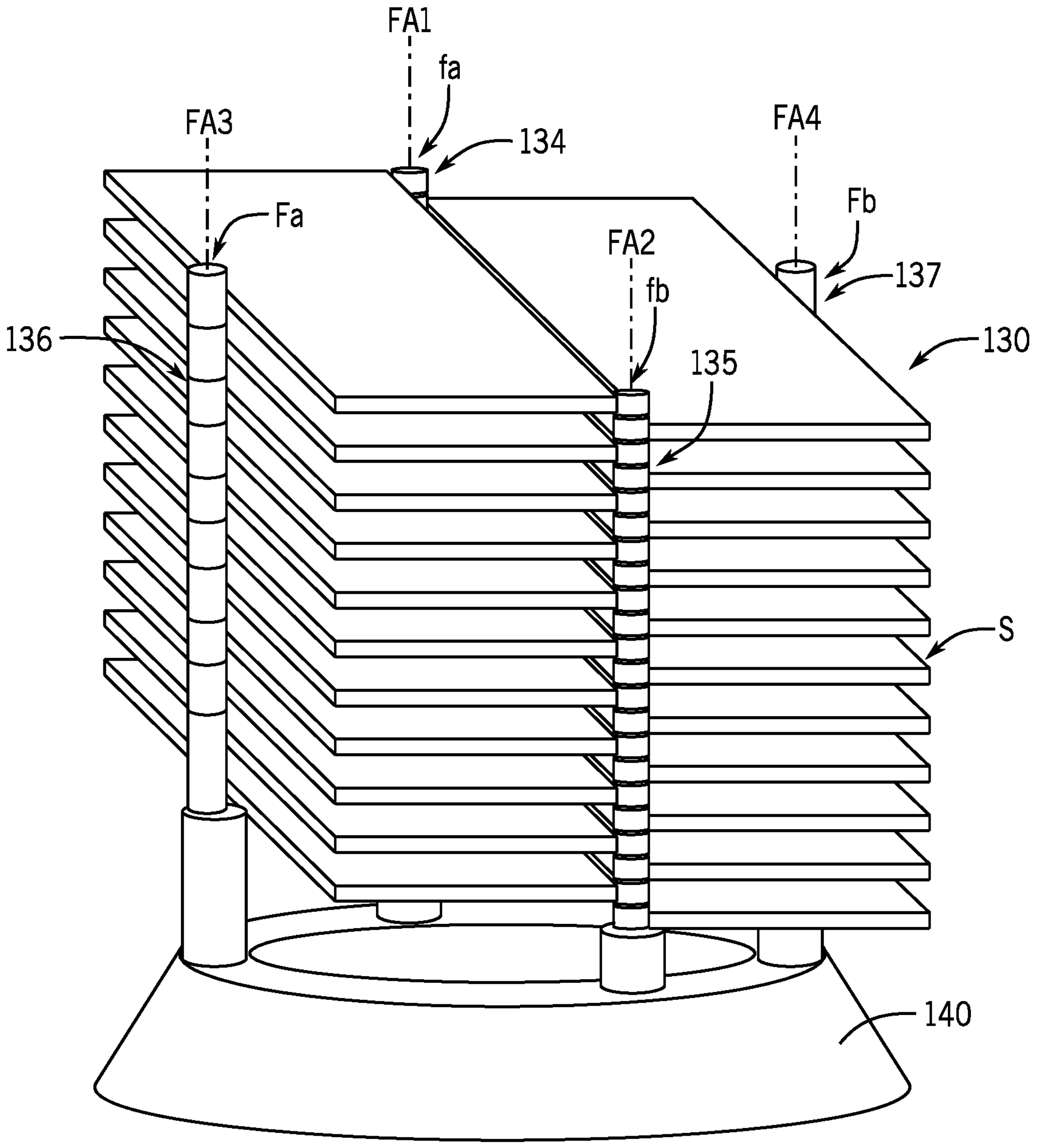
FIG. 3 is an isometric view of an exemplary spacecraft system according to the principles schematically represented in FIG. 2.

Referring additionally to FIG. 3, where less than 60 satellites S are shown for simplicity, the satellite separation fitting system may include first and second demi-separation fitting assemblies fa and fb configured to releasably mate satellites S1, S3, . . . S59 stacked in a first half of the stack 130 to stepped satellites S2, S4, . . . S60 stacked in a second half of the stack. In general the first and second demi-separation fitting assemblies fa and fb releasably mate the stepped satellites together at their stepped interface on opposite sides of the stack 130.

The first demi-separation fitting assembly fa is defined by a first stack of demi-separation fittings fa1-fa60 extending laterally from a first corner of the respective satellite S1-S60 toward the center of the stack 130. In particular, demi-separation fittings fa1, fa3, . . . fa59 of corresponding satellites S1, S3, . . . , and S59 in a first half of the stack 130 are configured to releasably mate with the demi-separation fittings fa2, fa4, . . . fa60 of corresponding satellites S2, S4, . . . , and S60 in a second half of the stack 130. The demi-separation fittings fa1, fa2, fa3, fa4, . . . fa58, fa59, fa60 stack in an alternating fashion to define an aligned column of demi-separation fittings fa1-fa60. The stacked demi-separation fittings fa1-fa60 of the first demi-separation fitting assembly fa define a first load column 134 for the stack 130 having a first fitting axis FA1 along which load passes during launch of the rocket.

Similarly, the second demi-separation fitting assembly fb is defined by a second stack of demi-separation fittings fb1-fb60 extending laterally from a second corner of the respective satellites S1-S60 along the same elongated edge of the satellite S and toward the center of the stack 130. In particular, demi-separation fittings fb1, fb3, . . . fb59 of corresponding satellites S1, S3, . . . , and S59 in the first half of the stack 130 are configured to releasably mate with the demi-separation fittings fb2, fb4, . . . fb60 of corresponding satellites S2, S4, . . . , and S60 in the second half of the stack 130. The demi-separation fittings fb1, fb2, fb3, fb4, . . . fb58, fb59, fb60 stack in an alternating fashion to define an aligned column of demi-separation fittings fb1-fb60. The stacked demi-separation fittings fb1-fb60 of the second demi-separation fitting assembly fb define a second load column 135 for the stack 130 having a second fitting axis FA2 along which load passes during launch of the rocket. The second load column 135 would be in front of the first load column 134 in the schematic shown in FIG. 2.

The first and second demi-separation fitting assemblies fa and fb may be configured to support any suitable stacked, stepped satellite arrangement other than what is shown. Moreover, although first and second demi-separation fitting assemblies fa and fb are shown interposed between stepped satellites, fewer that one or more than two demi-separation fitting assemblies may instead be used.

In the depicted exemplary embodiment of FIG. 2, the satellite separation fitting system may further include first and second full height separation fitting assemblies Fa and Fb configured to releasably mate the satellites at third and fourth locations on opposite sides of the stack 130. In that regard, the separation fitting assemblies fa, fb, Fa, and Fb are defined at first, second, third, and fourth substantially equally spaced locations about the rectangular stack 130.

The first full height separation fitting assembly Fa is defined by a stack of full height separation fittings Fa1, Fa3, . . . Fa57, Fa59 extending from the elongated edge of the corresponding satellite S1, S3, . . . S57, S59 opposite the elongated edge from which the demi-height separation fitting assemblies fa1/fb1, fa3/fb3, . . . fa57/fb57, and fa59/fb59 extend. Similarly, the second full height separation fitting assembly Fb is defined by a stack of full height separation fittings Fb2, Fb4, . . . Fb58, Fb60 extending from the elongated edge of the corresponding satellite S2, S4, . . . S58, S60 opposite the elongated edge from which the demi-height separation fitting assemblies fa2/fb2, fa4/fb4, . . . fa58/fb58, and fa60/fb60 extend. It should be appreciated that the stack separation fitting system may instead include only one or more than two full height separation fitting assemblies on the same or different edge of the satellite S.

For each full height separation fitting assembly Fa and Fb, the full height separation fitting of a first, bottom satellite is sized and configured to releasably mate with the full height stack separation fitting of an adjacently positioned second, top (and possibly third, bottom) satellite. For instance, in the first half of the stack, the full height stack separation fitting Fa3 of satellite S3 is sized and configured to releasably mate with full height stack separation fitting Fa1 of satellite S1 and with the full height separation fitting Fa5 of satellite S5. Similarly, in the second half of the stack, the full height stack separation fitting Fb4 of satellite S4 is sized and configured to releasably mate with full height stack separation fitting Fb2 of satellite S2 and with the full height separation fitting Fa6 of satellite S6.

The stacked full height separation fittings Fa1, Fa3, . . . Fa57, Fa59 and Fb2, Fb4, . . . Fb58, Fb60 of the first and second full height separation fitting assemblies Fa and Fb define third and fourth load columns 136 and 137 on each side of the stack 130. The third and fourth load columns 136 and 137 define third and fourth fitting axes FA3 and FA4, respectively, along which load passes during launch of the rocket.

As noted above, the separation fitting assemblies fa, fb, Fa, and Fb are defined at first, second, third, and fourth substantially equally spaced locations about the rectangular stack 130. As such, the releasably mated stack separation fittings of the stacked satellites define first, second, third, and fourth equally spaced load columns 134, 135, 136, and 137 for the substantially rectangular stack 130. The evenly spaced arrangement of the load columns 134, 135, 136, and 137 substantially distributes the load evenly along the stack 130 during launch. In that regard, in addition to stacking the satellites such that they passively release into orbit when released from the rocket, the stacked satellites themselves define the primary structure of the stack 130, with the load columns 134, 135, 136, and 137 defining the load paths. The columns may also define a grounding path for the stack 130 to the rocket 110.

Figure 4:
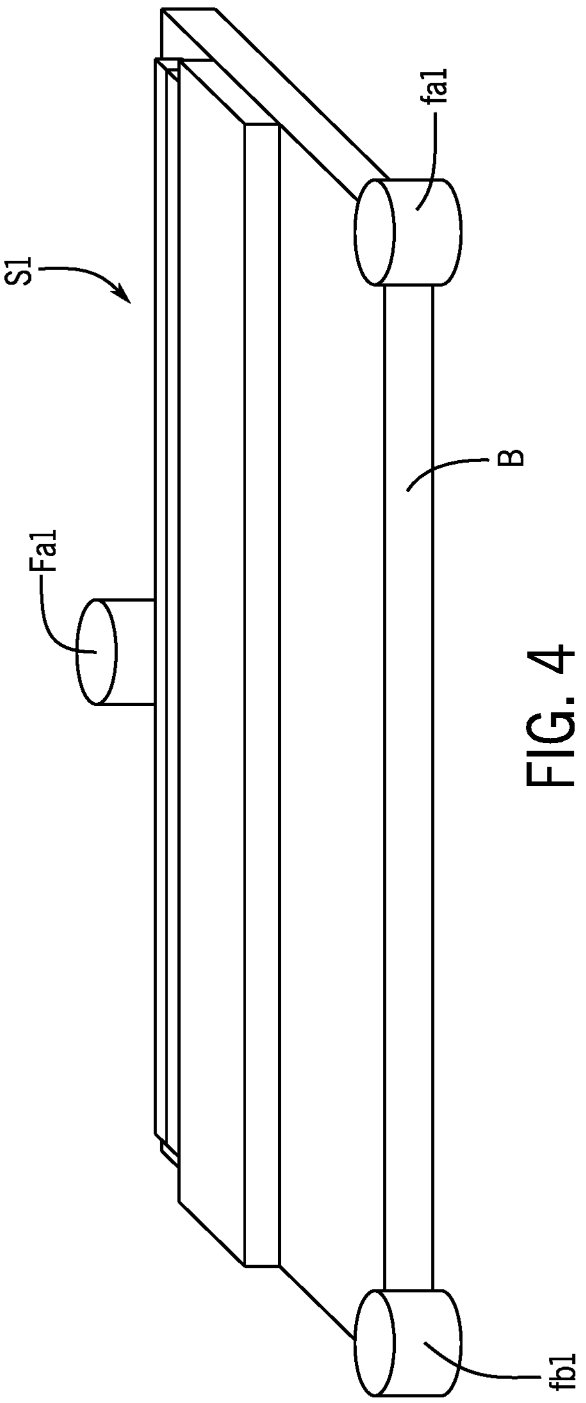
FIG. 4 is an isometric view of an exemplary embodiment of a spacecraft for use in the spacecraft system shown in FIG. 3.

Referring to FIGS. 3-5, 6A, and 6B, an exemplary embodiment of a separation fitting assembly configured to releasably mate the stepped satellites together such that they passively release into orbit and define a load column when stacked will now be described in more detail. FIG. 4 depicts a first satellite S1 having a substantially rectangular body B, with first and second demi-separation fittings fa1 and fb1 secured to opposite corners of one edge of the body B, and a full height separation fitting Fa1 secured to the body B in substantially the middle of the opposite edge (such as with bolts or other fasteners).

Each separation fitting is substantially identical, with the exception that the demi-separation fittings fa1 and fb1 are about half the height of the full height separation fitting Fa1 to accommodate the alternating stepped configuration of the stacked satellites, as described above and as further shown in FIG. 3. As such, only the first demi-separation fitting f1*a* will be described in detail.

Figure 5:
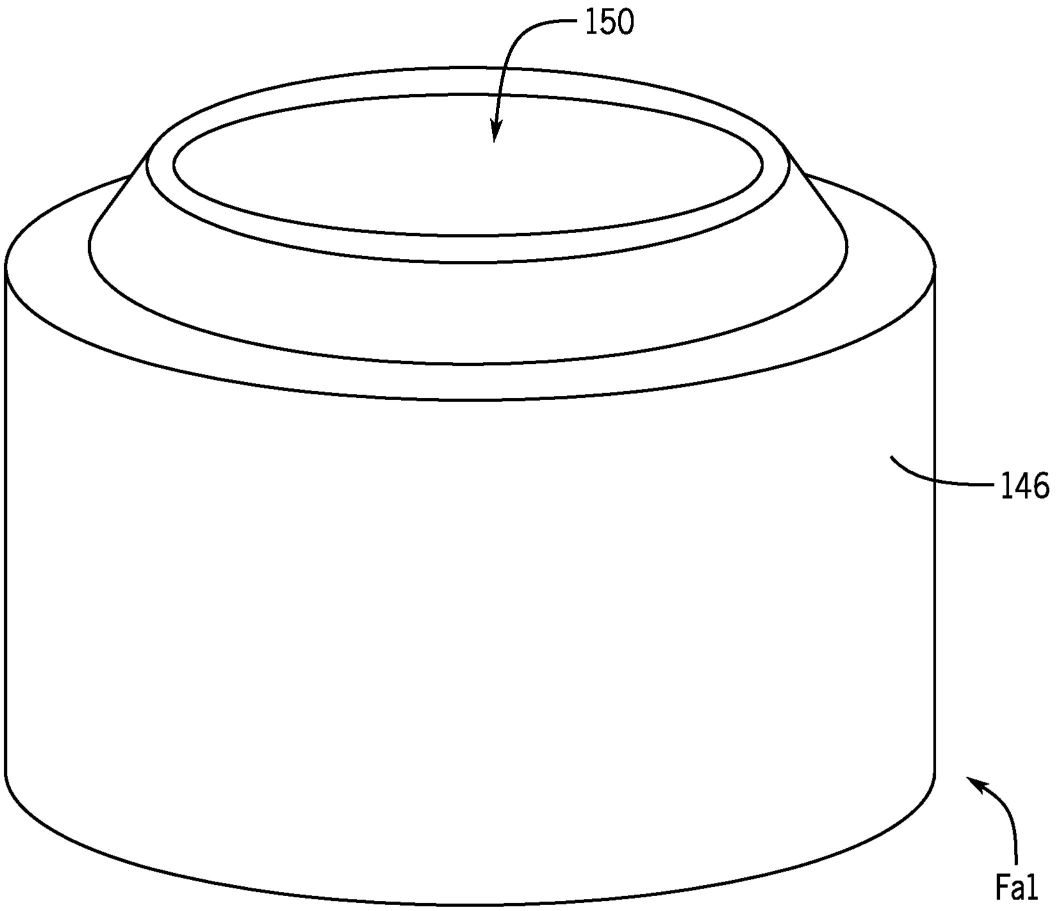
FIG. 5 is an isometric view of a separation fitting for use with the stacked configuration of spacecraft shown in FIG. 3.
Figure 6A:
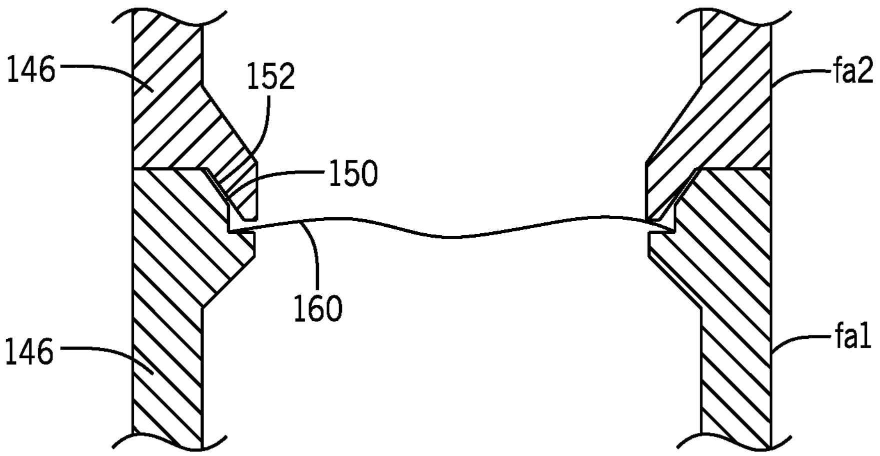
FIG. 6A is a cross-sectional view of stacked separation fittings for use with the stacked configuration of spacecraft shown in FIG. 3.
Figure 6B:
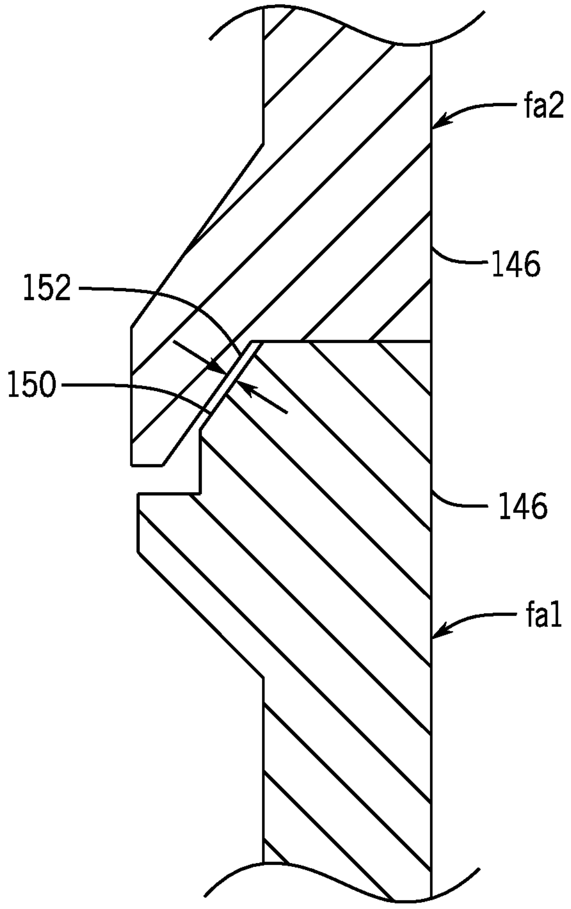
FIG. 6B is a zoomed-in view of the interface between the stacked separation fittings shown in FIG. 6A.
Figure 7:
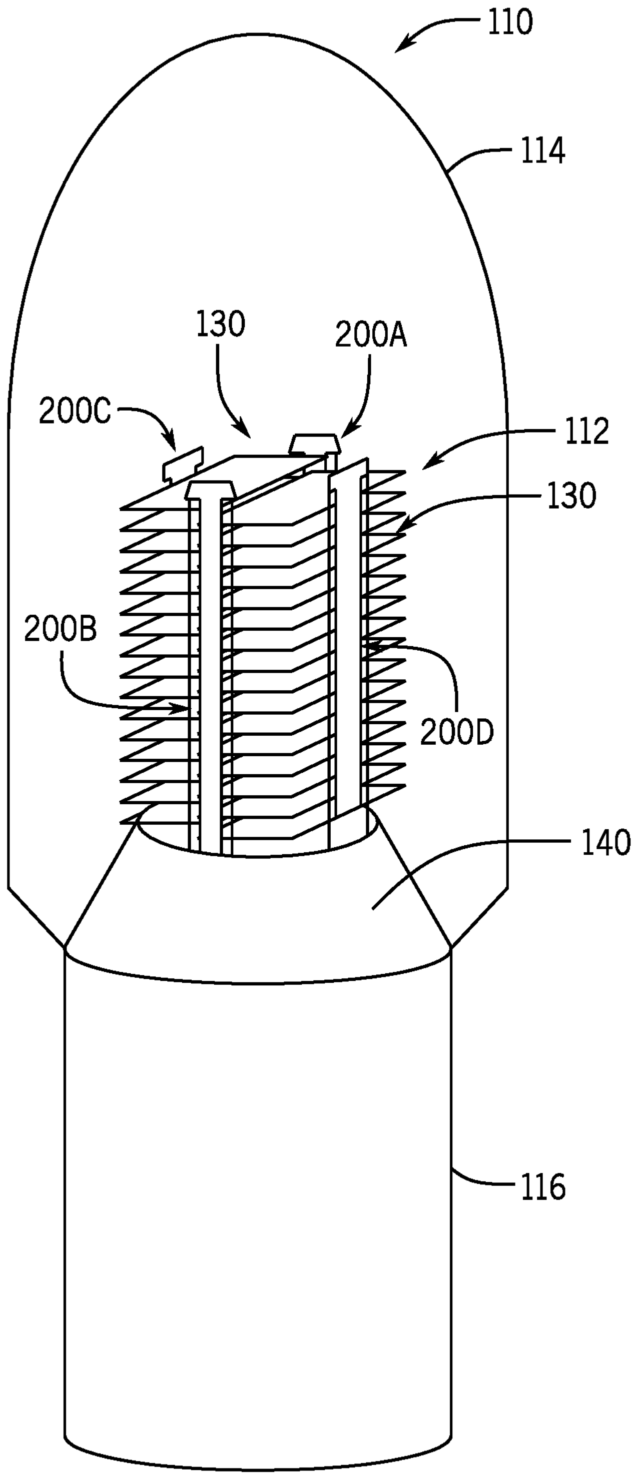
FIG. 7 is an isometric view of the exemplary spacecraft system shown in FIG. 3, wherein a hold-down and deploy system of the spacecraft system is shown in a first configuration and wherein the spacecraft system is shown disposed within a rocket.
Figure 8:
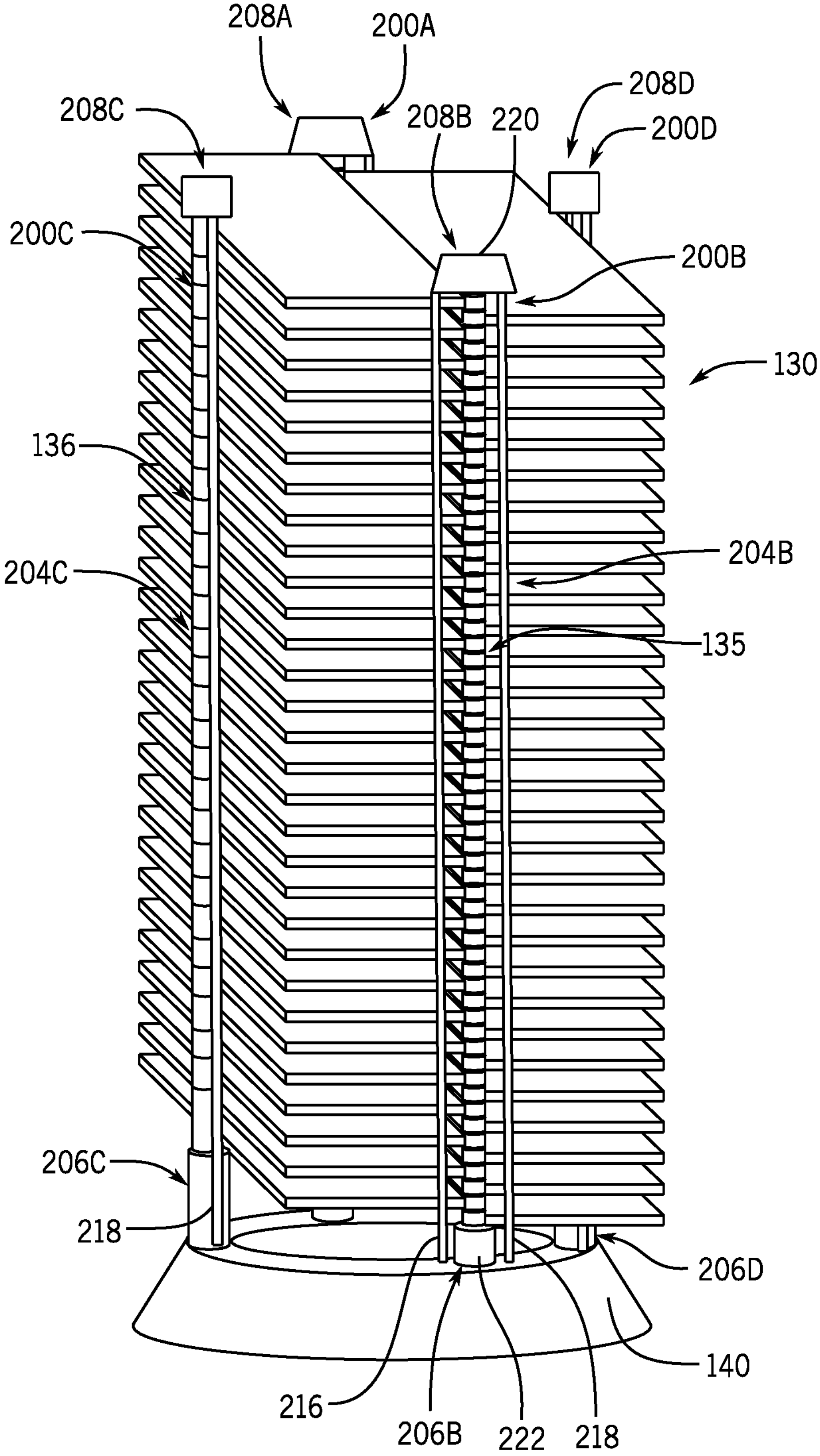
FIG. 8 is an isometric view of the exemplary spacecraft system shown in FIG. 7, wherein the hold-down and deploy system of the spacecraft system is shown in the first configuration.

Referring to FIGS. 5, 6A and 6B, the first separation fitting f1*a* includes a substantially cylindrical body 146 having a first interface 150 on a first (upper or forward) end, and a second interface 152 on a second (lower or aft) end. In the depicted embodiment, the first interface 150 is a cup shape, and the second interface 152 is a corresponding cone shape. In that regard, the cone-shaped second interface 152 of a top (or forward) satellite may be releasably received within or mated with the cup-shaped first interface 150 of a bottom (or aft) satellite, as shown in FIGS. 6A and 6B. The cup-cone interface of each separation fitting defines a joint between upper and lower satellites configured to withstand compressive loads, shear loads, and bending moment of the stack 130 during launch. In that regard, the separation fittings mate adjacent satellites such that no other significant portion of the satellite is required to withstand launch loads.

As can be seen in FIG. 6B, the cup-shaped first interface 150 has an inner diameter slightly larger than the outer diameter of the cone-shaped second interface 152 to prevent a taper lock between the interfaces. In other words, the cone-shaped second interface 152 is not press fit into the cup shaped first interface 150. Rather, the cone-shaped second interface 152 can be freely removed from the cup-shaped first interface 150 without any additional force. In that regard, the first and/or second interface 150/152 may be made with, treated with, or otherwise coated with a low-friction material to help ensure separation between the interfaces when the stack is released from the rocket. In one example, the first and/or second interface 150/152 is made from a hard-anodized material (such as aluminum) and/or coated with a dry film lubricant to define a low friction interface. In addition, a biasing device 160, such as a wave spring, may be disposed between the first and second interfaces 150 and 152 to help facilitate separation.

Spacecraft Hold-Down and Deploy Systems

As noted above with reference to FIG. 2, a structure extends along the length of the stack 130 to releasably secure the satellites S together and to releasably secure the stack 130 to a payload adaptor 140 of the launch vehicle 116. Upon reaching orbit, the structure coupled to the stack 130 is released from the stack so that each of the satellites S in the stack is passively dispensed from the payload adaptor 140 of the launch vehicle 116 without the use of a dedicated dispensing system (see FIG. 10). In other words, with the stack 130 arranged as a plurality of spacecraft S in layers, and with each spacecraft S releasably mated with at least one spacecraft S in an adjacent layer, the external structure is configured to, in a first configuration, secure the layers of the stack 130 together and secure the entire stack 130 to the launch vehicle 116, and, in a second configuration, release the entire stack 130 from the launch vehicle 116 into orbit such that the layers passively separate without activation of additional dispensing mechanisms.

Figure 9:
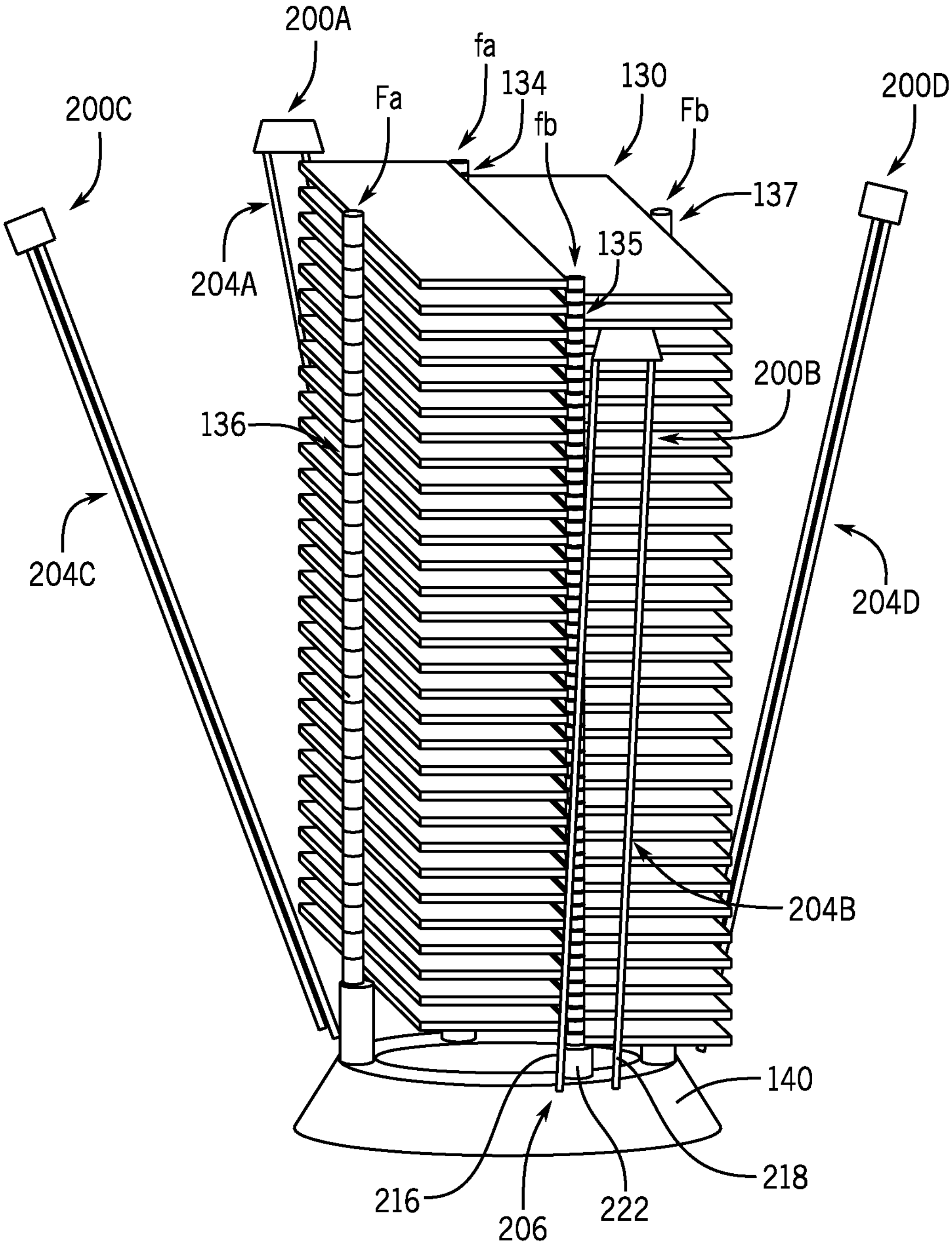
FIG. 9 is an isometric view of the exemplary spacecraft system shown in FIG. 3, wherein the hold-down and deploy system of the spacecraft system is shown in a second configuration.

Referring to FIGS. 2 and 7-10, in one embodiment, the structure is defined by first, second, third, and fourth hold-down and deploy systems 200A, 200B, 200C, and 200D extending externally along the length of the first, second, third, and fourth load columns 134, 135, 136, and 137. The first, second, third, and fourth hold-down and deploy systems 200A, 200B, 200C, and 200D are configured to apply a compressive load along the length of the corresponding first, second, third, and fourth load columns 134, 135, 136, and 137 in the first configuration (FIG. 8) and release the compressive load from the load columns in the second configuration (FIG. 9).

A general description of the first, second, third, and fourth hold-down and deploy systems 200A, 200B, 200C, and 200D will first be provided. The first, second, third, and fourth hold-down and deploy systems 200A, 200B, 200C, and 200D include first, second, third, and fourth tension rod assemblies 204A, 204B, 204C, and 204D, respectively, extending lengthwise between an aft tensioning and release mechanism 206A, 206B, 206C, and 206D and a forward tensioning and release mechanism 208A, 208B, 208C, and 208D, respectively. The first, second, third, and fourth hold-down and deploy systems 200A, 200B, 200C, and 200D are substantially identical; accordingly, the following description will generally describe a hold-down and deploy system 200 having a tension rod assembly 204 extending lengthwise between an aft tensioning and release mechanism 206 and a forward tensioning and release mechanism 208. Moreover, it should be appreciated that the fewer or more than four hold-down and deploy systems may instead be used.

In the first configuration (FIG. 8), the aft and forward tensioning and release mechanisms 206 and 208, in cooperation, stretch or otherwise create tension in the tension rod assembly 204, and in the second configuration, release the stretch/tension in the tension rod assembly 204. As a result, in the first configuration, the aft and forward tensioning and release mechanisms 206 and 208 cooperatively apply a compressive load to the corresponding load column (a "preload") 134, 135, 136, or 137. Moreover, in the second configuration (FIG. 9), the aft and forward tensioning and release mechanisms 206 and 208 cooperatively release all compressive loads from the load column and allow the stack to separate from the rocket.

The forward tensioning and release mechanism 208 includes a load head 220 that selectively engages the uppermost separation fitting in the respective load column such that it may apply a compressive load to the column when pulled down by the tension rod assembly 204. In one embodiment, the forward tensioning and release mechanism 208 is configured as a biased latching structure configured to latch the load head 220 to the top or forward end of the load column when a predetermined amount of load is imposed in the tension rod assembly 204, and configured to unlatch or otherwise disengage the load head 220 from the load column when a predetermined amount of load is released in the tension rod assembly 204.

The tension rod assembly 204 may include first and second rods 216 and 218 that extend along each side of the load column between the load head 220 of the forward tensioning and release mechanism 208 and a base 222 of the aft tensioning and release mechanism 206. In this manner, the tension rods 216 and 218 can pull down substantially equally on the load head 220 to help evenly distribute the compressive load along the load column. In that regard, a suitable balancing mechanism may be used to help distribute tension between the first and second rods 216 and 218.

The aft tensioning and release mechanism 206 allows the load head 220 to move into and out of engagement with the top of the load column and selectively impose tension in the rods 216 and 218 when the load head 220 is engaged with the top of the load column. In that regard, the aft tensioning and release mechanism 206 may be defined as a hinge structure configured to hingedly secure the aft end of the tension rod assembly 204 to the payload adaptor 140. In other words, the hold down and deploy system 200 can pivot about a hinge axis of the aft tensioning and release mechanism 206 to move between the first and second configurations.

In one embodiment, the aft tensioning and release mechanism 206 is also configured to releasably secure the rods 216 and 218 to the payload adaptor 140. In such an embodiment, the hold-down and deploy system 200 (and specifically, the forward tensioning and release mechanism 208, the rods 216/218, and at least a portion of the aft tensioning and release mechanism 206) separates from the payload adaptor 140 when pivoting away from the stack 130 (i.e., around the same time the satellites separate from the payload adaptor 140).

As noted above, the aft tensioning and release mechanism 206 is also configured to selectively apply tension in the rods 216 and 218. Any suitable configuration may be used to pull down on the rods 216 and 218 or otherwise stretch the rods 216 and 218 between the aft and forward tensioning and release mechanisms 206 and 208. In one embodiment, the aft tensioning and release mechanism 206 includes an actuator assembly configured to pull the rods 216 and 218 downwardly away from the forward tensioning and release mechanism 208 (to apply tension) and configured to allow the rods 216 and 218 to move upwardly toward the forward tensioning and release mechanism 208 (to release tension).

In operation, when the load is released in the rods 216 and 218, the forward tensioning and release mechanism 208 starts to unlatch from the top of the load column. Around the same time, the rods 216/218 start to hinge about a pivot axis of the aft tensioning and release mechanism 206 away from the stack 130. The rods 216 and 218 continue to pivot away from the stack 130 until the load head 220 disengages from the top of the load column and separates from the stack 130 (see FIG. 9). With the load head 220 disengaged from the top of the load column, the compressive load is released, and the satellites are free to separate from each other and from the payload adaptor 140 (see FIG. 10).

Components of the aft and forward tensioning and release mechanisms 206 and 208 are configured to be moved by a suitable power assembly 210 for applying and releasing tension in the rods 216 and 218. The power assembly 210 may include any suitable components for transmitting energy, such as one or more pneumatic, hydraulic, mechanical, and/or electromechanical actuators configured to power moveable mechanical parts. For instance, in one embodiment, the power assembly 210 may be configured as a pneumatic or hydraulic system configured to move a piston between at least first and second positions along the length of the tension rod assembly 204 to apply or release tension in the rods 216 and 218. In that regard, the power assembly 210 may include one or more valves (such as solenoid vales) configured to selectively place an inlet and/or outlet line of the pneumatic or hydraulic system into fluid communication with a chamber of the piston for moving the piston.

The power assembly 210 may be activated by a suitable wired or wireless controller 219. For example, the controller 219 may include suitable circuitry for selectively opening one or more valves (such as solenoid vales) for fluidly connecting an inlet and/or outlet line (of a pneumatic or hydraulic assembly) with a chamber of the piston for moving the piston. In some embodiments, the controller 219 may include suitable circuitry for activating and controlling the speed, direction, etc., of a motor to control the movement of the piston or other moveable structure.

In some embodiments, the controller 219 may also be in wired or wireless communication with one or more input devices of the hold-down and deploy system 200, such as sensors, switches, etc. For instance, the tension rods 216 and 218 may include strain gauges for measuring the tension in the rods during ground operations before launch and/or during launch. In addition, and as noted above, the separation fittings may include pressure sensors or switches that are activated when adjacent satellites separate. The input devices may include suitable circuitry to send one or more output signals indicative of a measurement, status, etc., and the controller 219 may include suitable circuitry for processing the one or more output signals.

The controller 219 may be any suitable electronic client device, such as a computer, personal digital assistant, cell phone, tablet computer, or any other suitable device on a network in which computer software or other digital content may be executed. The electronic client device can be controlled either directly or by a remote connection using industry standard communication protocols such as HART, Modbus, 4-20 mA, and H1, as well as other protocols.

Flat Spin Deployment of Spacecraft

Referring to FIGS. 10 and 11A-11D, in accordance with one embodiment of the present disclosure, a series of schematic drawings of a multistage rocket 110 preparing for launch of a spacecraft system, including a plurality of satellites S, is shown. At launch, at least one hold down and deploy system is in the first configuration such that it secures the layers of the stack 130 together and secures the entire stack 130 to the rocket 110. In the depicted embodiment, first, second, third, and fourth hold down and deploy systems 200A, 200B, 200C, and 200D are used, although fewer or more than four hold down and deploy systems may instead be used.

Figure 10:
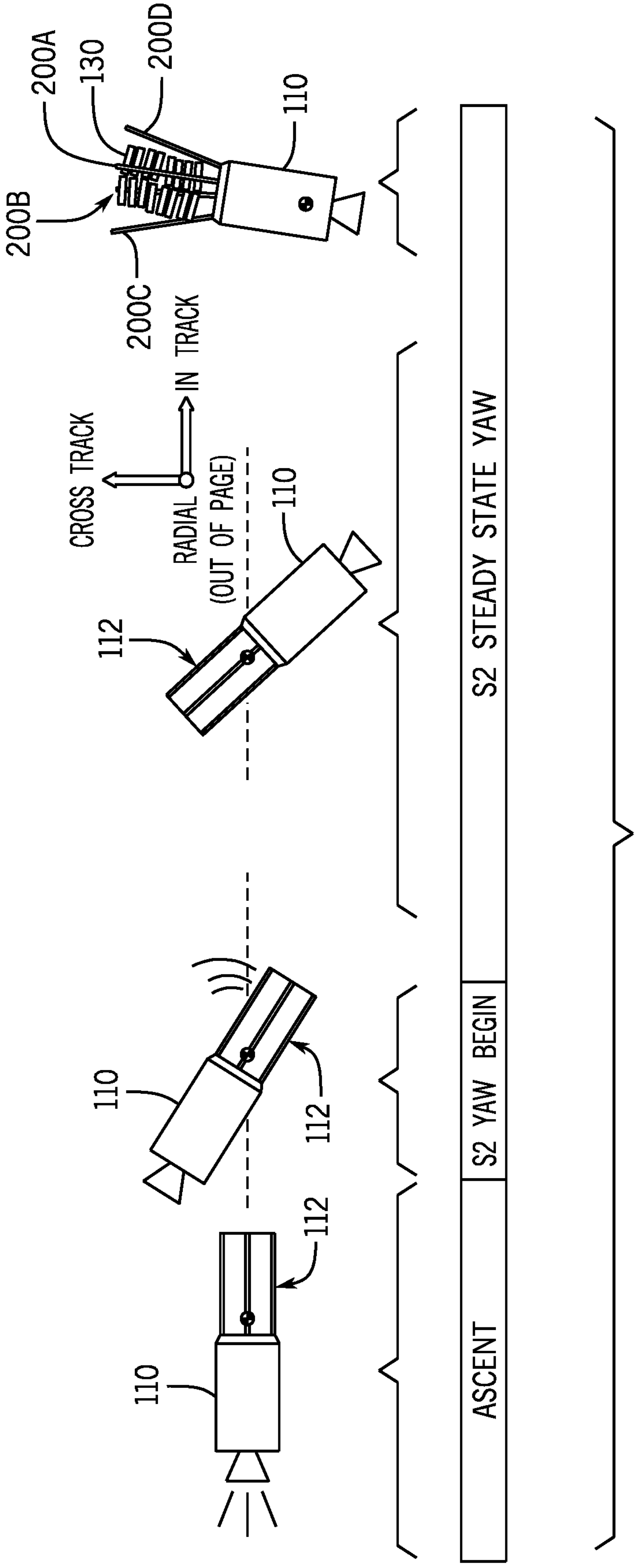
FIGS. 10 and 11A-11C depict simplified diagrams of the release of a spacecraft system including a plurality of satellites from a rocket.

Referring to FIG. 10, the second stage S2 of the rocket 110 is shown ignited and burning through the powered ascent ("Ascent"). The stage S2 enters orbit, the engine is turned off, and the stage S2 starts coasting. As the stage S2 enters orbit, thrusters of the stage S2 are used to induce yaw ("S2 Yaw Begin"), or a rotation of the stage S2 about its center of mass, steady state yaw is achieved ("S2 Steady State Yaw"). During this "flat spin" of the stage S2, hold down and deploy systems 200A-200D are moved into the second configuration to release the entire stack 130 from the stage S2 (i.e., the stack 130 is no longer constrained to the stage S2), as shown in the far right image of FIG. 10.

With the stacked satellites S releasably mated together, as described above, the satellites passively spread out and move into orbit when they are released from the stage S2 during the flat spin. More specifically, the distance of the satellite S from the center of mass about which the stage S2 rotates correlates to the linear speed of the satellite as it is released from the stack. The farther from the center of mass, the faster the linear speed (ΔV) of the satellite as it is released. Thus, at the moment of separation from the stage S2, the satellites S have a linear speed along the direction of the orbital path that is in proportion to their distance from the center of mass of the stage S2. The outer (forward) satellites travel faster than the inner (aft) satellites, resulting in a natural passive separation and spreading out of the satellites.

Such a passive separation system is cheaper, lighter, and easier, than a typical system that, for instance, uses a set of carefully tuned springs to define a small increment in ΔV between adjacently stacked satellites.

Figures 11A, 11B, 11C:
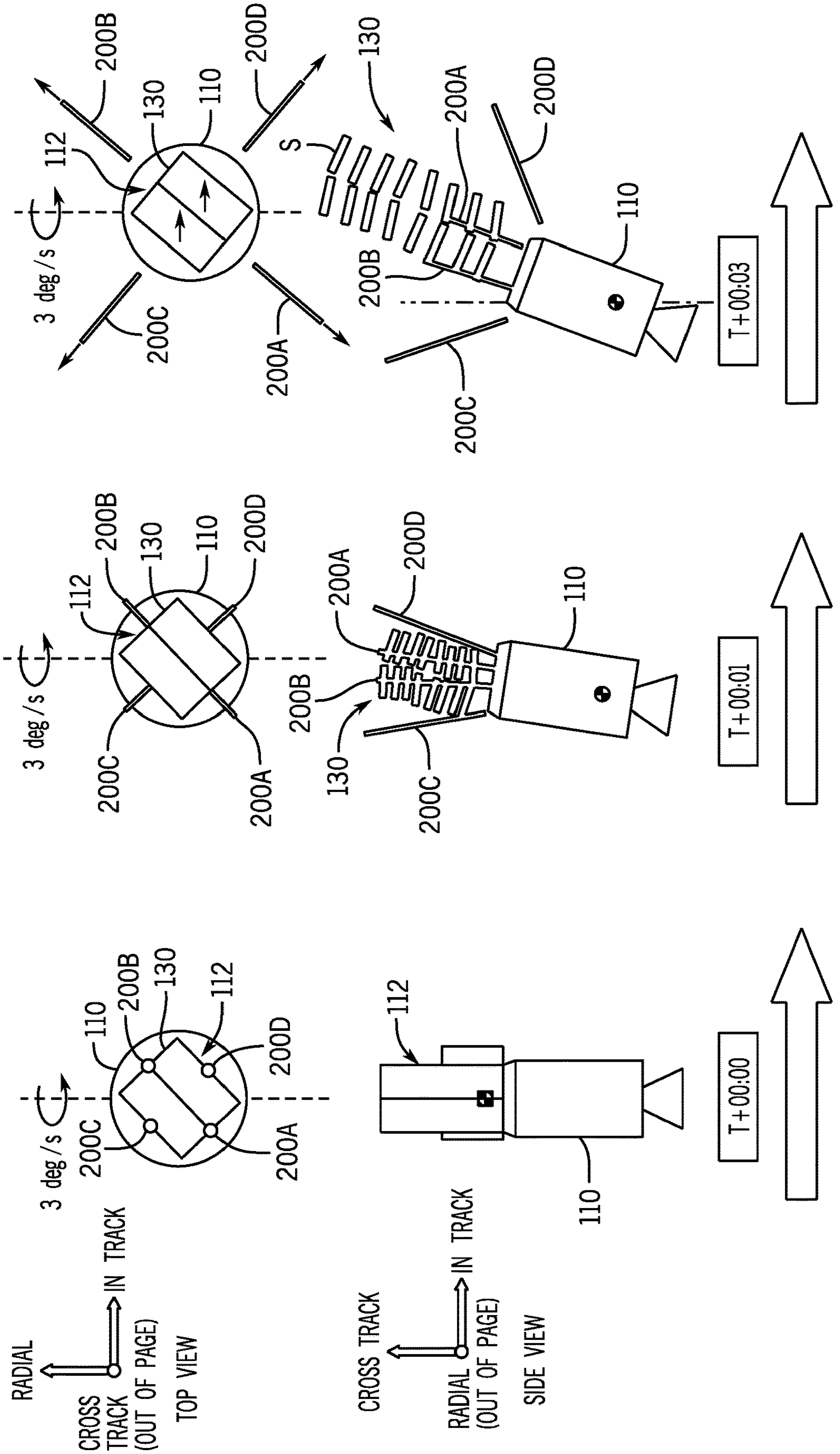

Referring to FIGS. 11A-11C, the stack 130 may be oriented on the stage S2 such that the first, second, third, and fourth hold down and deploy systems 200A, 200B, 200C, and 200D follow an intended orbital path when released from the rocket during the flat spin. More specifically, hold down and deploy systems 200A-200D are released from the rocket during the flat spin such that the hold down and deploy systems 200A-200D does not collide with any of the satellites as they are simultaneously released from the rocket. In the depicted embodiment, first, second, third, and fourth hold down and deploy systems 200A, 200B, 200C, and 200D are used, however it should be appreciated that fewer or more than four hold down and deploy systems may instead be used.

Referring to FIG. 11A, the first, second, third, and fourth hold down and deploy systems 200A, 200B, 200C, and 200D are used to secure the layers of the stack 130 together and to secure the entire stack 130 to the stage of the rocket 110. The stack 130 is oriented on the rocket 110 (or the rocket is oriented) such that the first, second, third, and fourth hold down and deploy systems 200A, 200B, 200C, and 200D are at about a 22.5 degree (22.5°) angle, a 67.5 degree (67.5°) angle, a 112.5 degree (112.5°) angle, and a 157.5 degree (157.5°) angle, respectively, about the rocket circumference from a top view (cross track) of the rocket 110 in orbit, with the zero degree position in the radial direction. In other words, the orientation of the rocket 110 (or the stack 130) is rotated about forty-five degrees (45°). In this manner, when the first, second, third, and fourth hold down and deploy systems 200A, 200B, 200C, and 200D are released from the stack 130 and the rocket 110, as shown in FIGS. 11B and 11C, the first and fourth hold down and deploy systems 200A and 200D are released retrograde into orbit, and the second and third hold down and deploy systems 200B and 200C are released posigrade into orbit.

By comparison, if the rocket was oriented with the first, second, third, and fourth hold down and deploy systems 200A, 200B, 200C, and 200D, at a 0 degree (0°) angle, a 90 degree (90°) angle, a 135 degree (135°) angle, and a 180 degree (180°) angle, respectively, about the rocket circumference, two of the hold down and deploy systems would be released with a high linear velocity in the retrograde and posigrade directions, and the other two hold down and deploy systems would be released with a lower linear velocity in an orbital direction that follows the stage and the released satellites (possibly colliding with them).

While illustrative embodiments have been illustrated and described, it will be appreciated that various changes can be made therein without departing from the spirit and scope of the disclosure.

What is claimed is:

1. A method of deploying a plurality of spacecraft, the method comprising:

coupling the plurality of spacecraft in a stack to a payload adaptor via at least one tension rod extending along an entirety of the stack along a longitudinal axis;

launching the payload adaptor into an orbit; and releasing, after the payload adaptor reaches the orbit, the at least one tension rod, wherein the releasing decouples the entirety of the stack from the payload adaptor.

2. The method of claim 1, further comprising arranging the spacecraft in the stack such that spacecraft in adjacent layers of the stack are releasably mated together.

3. The method of claim 1, wherein the step of coupling the plurality of spacecraft in the stack to the payload adaptor comprises activating at least one hold down and deploy system to releasably secure the stack to the payload adaptor.

4. The method of claim 3, wherein the step of activating the at least one hold down and deploy system to releasably secure the stack to the payload adaptor comprises releasably securing a first end of the at least one tension rod to the payload adaptor and releasably securing a second end of the at least one tension rod to the stack.

5. The method of claim 4, further comprising imposing, after the payload adaptor reaches the orbit, a spin on the stack, wherein the step of releasing the at least one tension rod is performed after imposing the spin.

6. The method of claim 5, wherein the step of releasing the at least one tension rod further comprises disengaging the at least one tension rod from the payload adaptor.

7. The method of claim 6, further comprising orienting the payload adaptor such that the at least one tension rod follows an intended orbital path after the at least one tension rod is disengaged from the payload adaptor.

8. The method of claim 1, further comprising imposing, after the payload adaptor reaches the orbit, a spin on the stack about an axis transverse to the longitudinal axis, wherein the step of releasing the at least one tension rod occurs during the spin.

9. The method of claim 1, wherein the at least one tension rod includes a plurality of tension rods, wherein each tension rod is releasably secured to the payload adaptor at a first end and releasably secured to the stack at a second end.

10. The method of claim 9, wherein the step of releasing the at least one tension rod comprises disengaging the plurality of tension rods from the stack to release the stack from the payload adaptor.

11. The method of claim 10, wherein the step of releasing the at least one tension rod comprises disengaging the plurality of tension rods from the payload adaptor.

12. The method of claim 11, further comprising orienting the payload adaptor during the step of releasing the at least one tension rod such that each of the plurality of tension rods follows a posigrade or retrograde path after disengagement from the payload adaptor.

13. A method of releasing spacecraft from a payload adaptor, the method comprising:

arranging spacecraft in a stack on the payload adaptor, the stack extending along a longitudinal axis;

applying a compressive load along a length of the stack, including engaging the stack with at least one hold down and deploy system coupled to the payload adaptor;

launching the payload adaptor into an orbit;

after the payload adaptor reaches the orbit, orienting the payload adaptor in a release orientation; and after orienting the payload adapter in the release orientation, releasing the compressive load, including disengaging the at least one hold down and deploy system from the stack and the payload adaptor, to allow an entirety of the stack to passively separate from the payload adaptor, wherein the release orientation causes the at least one hold down and deploy system to follow an intended orbital path after the at least one hold down and deploy system is disengaged.

14. The method of claim 13, wherein the step of engaging the stack with the at least one hold down and deploy system comprises engaging the stack with a plurality of hold down and deploy systems, wherein each hold down and deploy system extends along an entire length of the stack and is releasably secured to the payload adaptor at a first end and releasably secured to the stack at a second end.

15. A method for deploying spacecraft into orbit, the method comprising:

arranging a stack of spacecraft on a payload adaptor, the stack extending along a longitudinal axis, with each layer of the stack defined by at least one spacecraft and with each spacecraft being releasably mated with at least one spacecraft in an adjacent layer;

securing a first end of a tension rod to the payload adaptor and a second end of the tension rod to the stack;

launching the payload adaptor into an orbit; and releasing, as the payload adaptor is in the orbit, an entirety of the stack from the payload adaptor to allow the stack to passively separate.

16. The method of claim 15, further comprising imposing, after the payload adaptor reaches the orbit, a spin on the stack about an axis transverse to the longitudinal axis, wherein the step of releasing the entirety of the stack occurs during the spin.

* * * * *